United States Patent [19]

McPheeters et al.

[11] Patent Number: 5,330,859
[45] Date of Patent: Jul. 19, 1994

[54] SOLID OXIDE FUEL CELL WITH SINGLE MATERIAL FOR ELECTRODES AND INTERCONNECT

[75] Inventors: Charles C. McPheeters, Naperville; Paul A. Nelson, Wheaton; Dennis W. Dees, Downers Grove, all of Ill.

[73] Assignee: University of Chicago, Chicago, Ill.

[21] Appl. No.: 934,364

[22] Filed: Aug. 24, 1992

[51] Int. Cl.$^5$ ............................................. H01M 8/10
[52] U.S. Cl. ........................................ 429/33; 429/30
[58] Field of Search ................................. 429/30, 34

[56] References Cited

U.S. PATENT DOCUMENTS

| | | | |
|---|---|---|---|
| 4,749,632 | 6/1988 | Flandermeyer et al. | 429/33 |
| 5,063,122 | 11/1991 | Rohr | 429/32 |
| 5,169,506 | 12/1992 | Michaels | 204/274 |
| 5,169,731 | 8/1992 | Yoshimura et al. | 429/30 |

*Primary Examiner*—Kathryn Gorgos
*Attorney, Agent, or Firm*—Reinhart, Boerner, Van Deuren, Norris & Rieselbach

[57] ABSTRACT

A solid oxide fuel cell having a plurality of individual cells. A solid oxide fuel cell has an anode and a cathode with electrolyte disposed therebetween, and the anode, cathode and interconnect elements are comprised of substantially one material.

20 Claims, 5 Drawing Sheets

— PRIOR ART —

— PRIOR ART —

SOLID OXIDE FUEL CELL WITH SINGLE MATERIAL FOR ELECTRODES AND INTERCONNECT

The United States Government has rights in this invention pursuant to Contract W-31-109-ENG-38 between the U.S. Department of Energy and the University of Chicago.

The present invention is directed to a microchannel solid oxide fuel cell constructed of only two material components. More particularly, the invention is directed to a solid oxide fuel cell constructed of two material components which do not include nickel and have a relatively thin interconnect between the electrodes which also are quite thin to enhance electrical conductivity. One material, such as a Sr doped lanthanum chromite, can be used to construct both electrodes, electrical connector and fuel-oxygen separator between adjacent cells; and the second material is the electrolyte $ZrO_2$-$Y_2O_3$.

Conventional designs developed for solid oxide fuel cells include tubular, planar, and monolithic designs. In the tubular design, the traditional four fuel cell materials (anode 4, electrolyte 5, cathode 3, and interconnect 6) are deposited sequentially on a porous support tube by the electrochemical vapor deposition (ECVD) process. In FIG. 1 (described below), a tubular design is shown. The interconnect structure extends from the cathode layer 3 on the inside of the tube to the exterior surface where it contacts the anode layer 4 of the next cell electrical series. The tubular single cells are stacked together in a square array in which two or more cells are connected in parallel (side by side) while several cells are connected in series to build up the voltage of the system to practical levels. While the tubular concept is quite far advanced and has experienced considerable success in performance both as individual cells and in complete power systems, the concept suffers from high manufacturing cost due to the complexity of the ECVD process. The concept has also suffered from uncertain reliability of individual cells in the system.

In a planar design, essentially the same four fuel cell materials have been used to build single cells and stacks in a flat geometry instead of the tubular geometry. FIG. 2 (described below) shows the principle of the planar design. Individual cells are fabricated by tape casting the electrolyte layer 5, sintering and flattening the electrolyte layer, then applying the anode 4 and cathode layers 3 to the sintered electrolyte. The interconnect material 6 is formed with grooves for air and fuel gas flow. Alternating layers of single cells and interconnect material are stacked to form the fuel cell assembly. The flatness of the electrolyte and the interconnect layers is critical to good performance of the planar concept because good electrical contact must be maintained over the entire surface area of each cell. In addition, it is important to maintain good gas seals at the edges to prevent cross-leakage of the fuel and air streams. These requirements of extreme flatness and good gas seals limit the performance of the planar concept.

The same four fuel cell materials have been used to build single cells and stacks in a monolithic design. In the monolithic design, thin composites of anode 4/electrolyte 5/cathode 3 (A/E/C) and anode 4/interconnect 6/cathode 3 (A/I/C) materials are made either by tape casting or hot roll calendering. FIG. 3 (described below) shows the configuration of the co-flow design of the monolithic concept. The A/E/C composites are corrugated to form the air and fuel flow passages, and the A/I/C composites connect the cells in electrical series. While the monolithic concept has the potential for the highest performance in terms of power density and efficiency of any of the solid oxide fuel cell concepts, it suffers from the difficulty of fabricating a continuous, bonded structure with four different materials.

It is, therefore, an object of the invention to provide an improved solid oxide fuel cell and method of manufacture thereof.

It is another object of the invention to provide a novel solid oxide fuel cell constructed using only two basic materials.

It is further object of the invention to provide an improved solid oxide fuel cell constructed only of an electrolyte and a strontium doped lanthanum chromite.

It is yet another object of the invention to provide an improved solid oxide fuel cell having its electrodes and interconnect layer constructed of one basic material.

It is still a further object of the invention to provide a novel solid oxide fuel cell having reduced size gas flow channels enabling manufacture of a compact fuel cell with shortened electrical conduction paths.

It is yet an additional object of the invention to provide an improved solid oxide fuel cell constructed of materials tolerant of sulfur-containing fuels.

The subject invention relates generally to a solid oxide fuel cell using a single material for the electrodes and electrical interconnect, such as a $La_{0.9}Sr_{0.1}CrO_3$ which is stable under oxidizing and reducing environments. The use of a single material also advantageously provides a compatible material for the electrolyte and a favorable interface with the electrolyte and fuel or oxygen. Use of a single material also simplifies cell construction and problems of sintering shrinkage, thermal expansion and chemical incompatability are substantially minimized. Construction from a single material further eliminates problems which arise in conventional cells from use of sulfur-containing fuels or from chemical degradation of electrode materials upon cross leakage between fuel and air channels.

Other advantages and features of the invention are set forth in the following description and figures described herein below wherein like elements have like numerals throughout the several drawings.

DETAILED DESCRIPTION OF THE PREFERRED EMBODIMENTS

Figure 1:
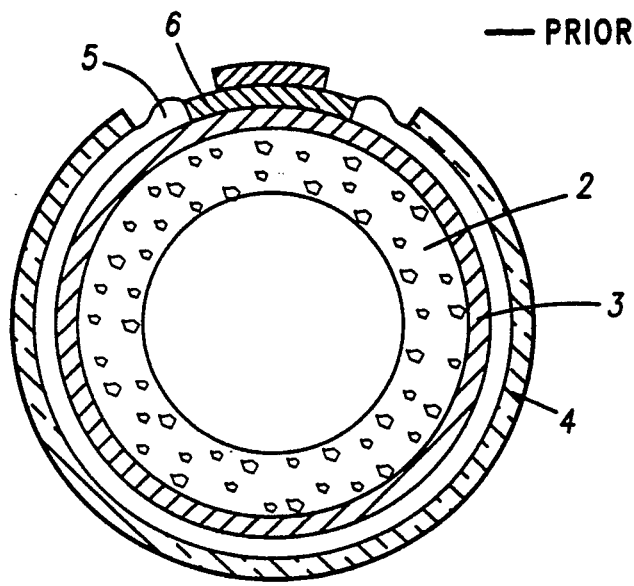
FIG. 1 illustrates a prior art tubular solid oxide fuel cell.
Figure 2:
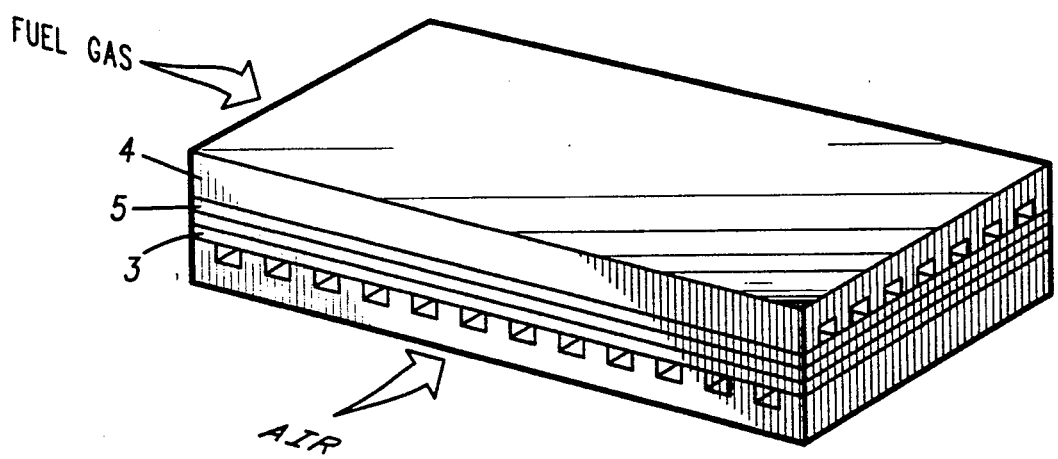
FIG. 2 illustrates a prior art planar solid oxide fuel cell.
Figure 3:
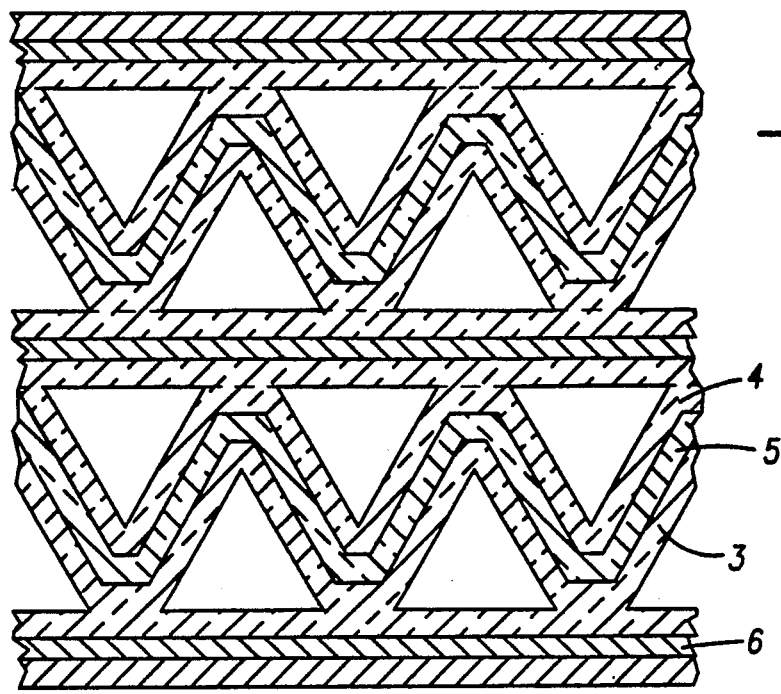
FIG. 3 illustrates a prior art monolithic solid oxide fuel cell.
Figure 4:
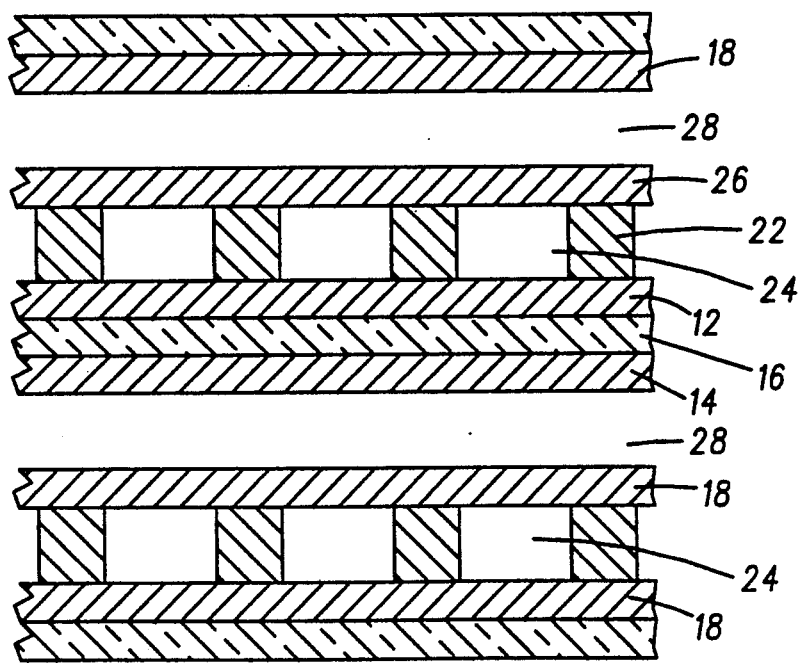
FIG. 4 illustrates a solid oxide fuel cell constructed in accordance with the invention.

A solid oxide fuel cell constructed in accordance with one form of the invention is indicated generally at 10 in FIG. 4. Both anode 12 and cathode 14 are comprised of any of a variety of conventional electrical interconnect materials, such as $La_{1-x}Sr_xCrO_3$ and $La_{1-x}Mg_xMnO_3$. Such materials are stable in both oxidizing and reducing environments, and therefore, it could be used for both the fuel and air electrodes. While the conductivity of such materials is not as high as common anode materials (such as, nickel-zirconia cermet) or conventional cathode materials (such as $La_{0.9}SR_{0.1}MnO_3$), the fuel cell 10 has thin electrodes 12, 14 in order to provide short conduction paths and low voltage losses with materials of mediocre electrical conductivity. Electrolyte 16 has generally the largest resistance in the fuel cell 10, but its resistance is reduced to practically useful levels by reducing the operating dimensions to minimum practical thicknesses (see FIG. 4).

Interconnect 18 is adjacent to the electrolyte 16 and defines part of a fuel channel 20 and preferably is porous. Interconnect 22, along with the interconnect 18, and 26 also defines the fuel channel 24 and can be either porous and/or dense to meet design objectives (e.g., matching coefficients of thermal expansion of adjacent components). Dense interconnect 26, along with another one of the interconnects 18, defines an air channel 28 and preferably is dense with low porosity.

These differences in density for the interconnects can be achieved by adjustment of the particle size distributions in selected regions of part or all of the above-described elements of the fuel cell 10. One can also use various sintering aids to densify the various interconnects 18, 22, 26 where necessary. Generally such interconnect materials do not easily sintar to low porosity. Thus, sinrating aids can be concentrated, for example, in the bipolar plate region to cause sinrating to low porosity in part or all of the interconnect 26.

The porosity of the various elements can further be controlled, such as in the electrode regions, by adjusting the particle size distributions in the materials used. In addition, the sinrating conditions can be modified to enhance sinterability of the interconnects 18, 22, 26. In conventional four material systems, it is necessary to minimize sintering temperature to minimize migration of elements such as Mn from the cathode 14. In the fuel cell 10, however, both the electrolyte 16 and the interconnects 18, 22, 26 are stable to quite high temperatures in both oxidizing and reducing environments. Consequently, substantial degrees of freedom are accorded by being able to adjust the sintering temperature and atmosphere to achieve the desired properties.

In the construction of the fuel cell 10 of the invention, the distance between the cells 10 is also reduced to minimize electrical resistance. The size of the air channels 28 is also reduced to minimize the cell-to-cell distance. Consequently, the pressure drop through the air channels 28 will be higher than conventional monolithic designs. Preferably, air channel 28 is larger than the fuel channel 24 because the air flow required for heat removal is higher than the fuel flow.

Variations in the fuel flow between channels will not typically be as demanding as with prior art fuel cell designs because the interconnect material is much more stable. If fuel 30 is depleted in one of the fuel channels 24, the various electrode materials will remain intact and continue to function as a conductor.

In the fuel cell 10, the lengths of the air channels 28 and the fuel channels 24 can also be adjusted as needed to charge or equalize the pressure drops in the two gas streams.

Therefore, in view of the structure, advantages attendant to the fuel cell 10 are, for example:

1. The two-material structure makes the construction process much simpler, in terms of ceramic formulation, shrinkage matching, coefficient of thermal expansion matching, and lay-up of stacks.

2. The interconnect material is stable in both air and fuel; therefore, cross leakage will have no effect on the stability of the electrodes. The stability of both the interconnect material and the electrolyte material will allow the fuel cell to operate for very long times with essentially no detrimental migration of elements from one layer into the other.

3. Since the interconnect material is stable in both oxidizing and reducing environments, it should be possible push the fuel utilization well beyond the usual 85% targeted in other solid oxide fuel cell concepts. The only concern will be efficiency of operation rather than possible oxidation of the anode material or reduction of the cathode material. Fuel flow maldistribution should have little effect on fuel cell performance or lifetime.

4. Because the two-component fuel cell has no nickel in the fuel electrode, sulfur is not expected to have a significant effect on the fuel electrode performance. The fuel cell can operate on high-sulfur fuels or even pure $H_2S$.

The following non-limiting Example describes one form of the invention.

EXAMPLE

The performance of the fuel cell 10 was determined using a conventional, well known calculational model "CROSSFLOW" (see Appendix A) a source code output, which was developed by the inventors to evaluate the concepts described herein. The CROSSFLOW model is designed to accept any desired geometric configuration, any desired materials resistivities, and any desired process parameters (such as gas inlet temperatures, compositions, and flows). The model calculates the performance of a single cell in a fuel cell stack based on the input data, and the calculated parameters are output in the form of a data summary sheet (see Table 1) and five plots (see FIGS. 5–9) of gas temperatures, Nernst potentials, local current densities, and oxygen pressure as a function of position in the single cell layer.

The results of analysis of the two-component fuel cell with the CROSSFLOW model are summarized in the output data sheet, Table 1. The case that was analyzed was a fuel cell module with overall dimensions of 10 cm on each side. The electrolyte and interconnect layers were assumed to be 25 microns thick, as were the electrode layers. The fuel and air channels were 200 microns and 300 microns square, respectively. These are fairly small channels compared with "conventional" fuel cell designs; however, the pressure drops are reasonable at 0.03 atm and 0.1 atm, respectively for the fuel and air streams. The power generated by this 10-cm cubic fuel cell is 1.7 kW at 0.7 V/cell, 87% fuel utilization, and the efficiency is 47%. While the power density (1.7 kW/L) is low in comparison to monolithic solid oxide fuel cell calculations (4.0 kW/L), it is adequate for many applications, including cogeneration, stationary power, and many portable-power applications.

Figure 5:
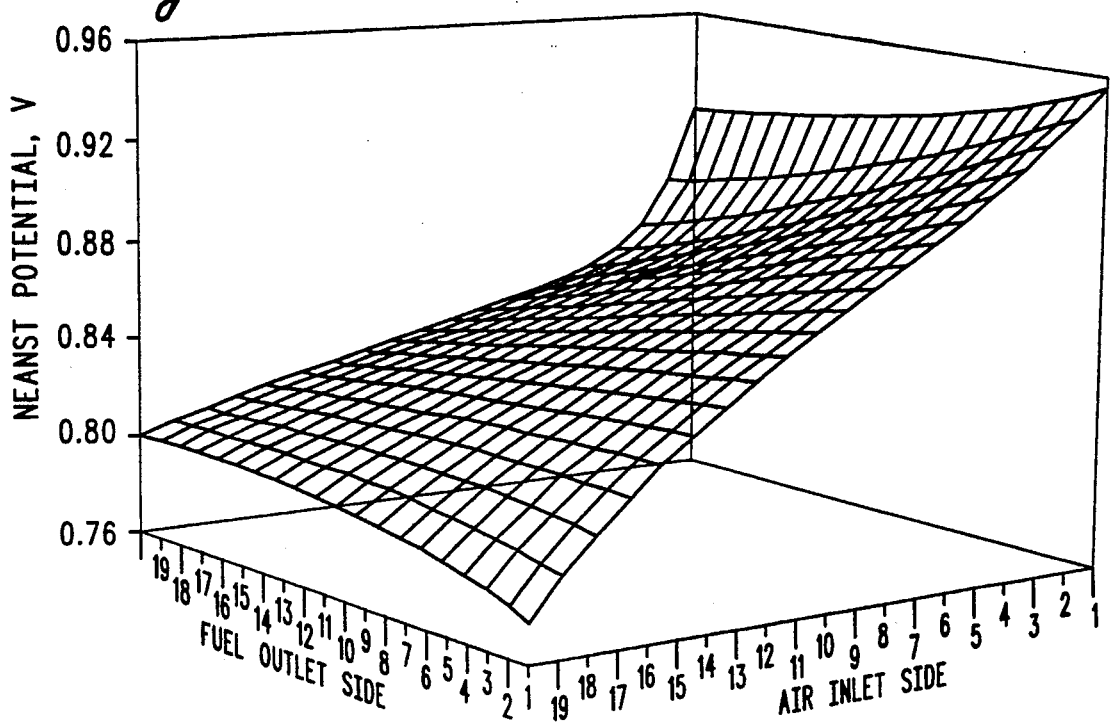
FIG. 5 illustrates the distribution of Nernst potential across the area of the two-component solid oxide fuel cell.
Figure 6:
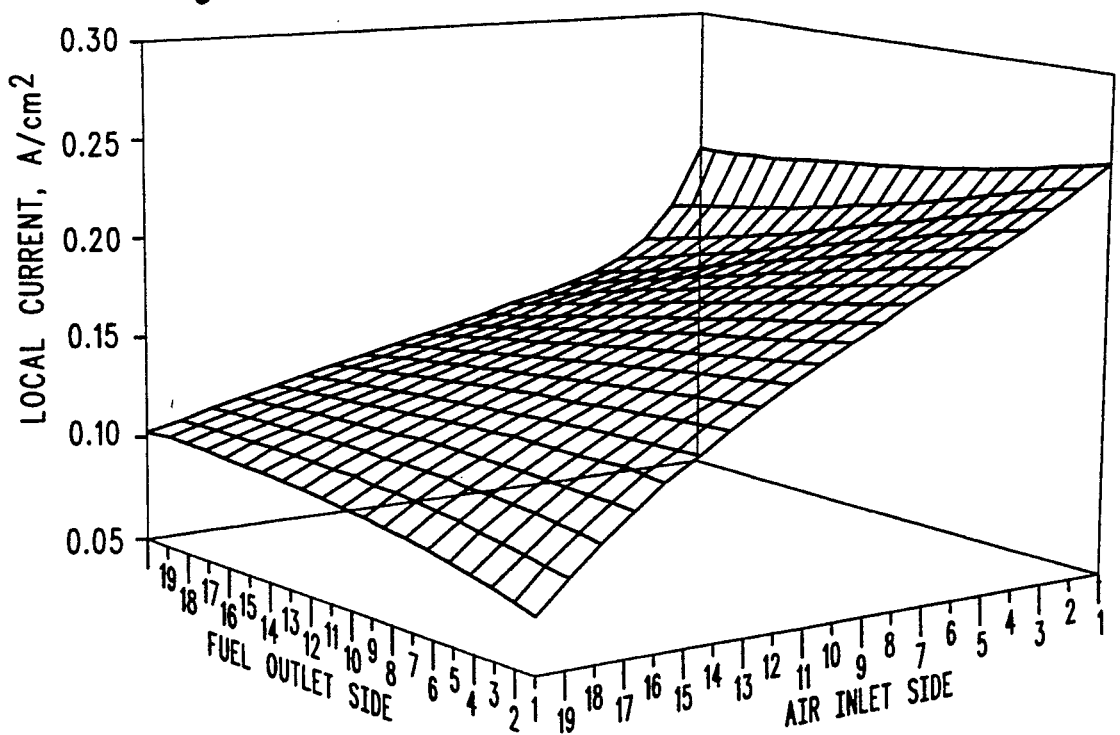
FIG. 6 illustrates the distribution of current density across the area of the two-component solid oxide fuel cell.
Figure 7:
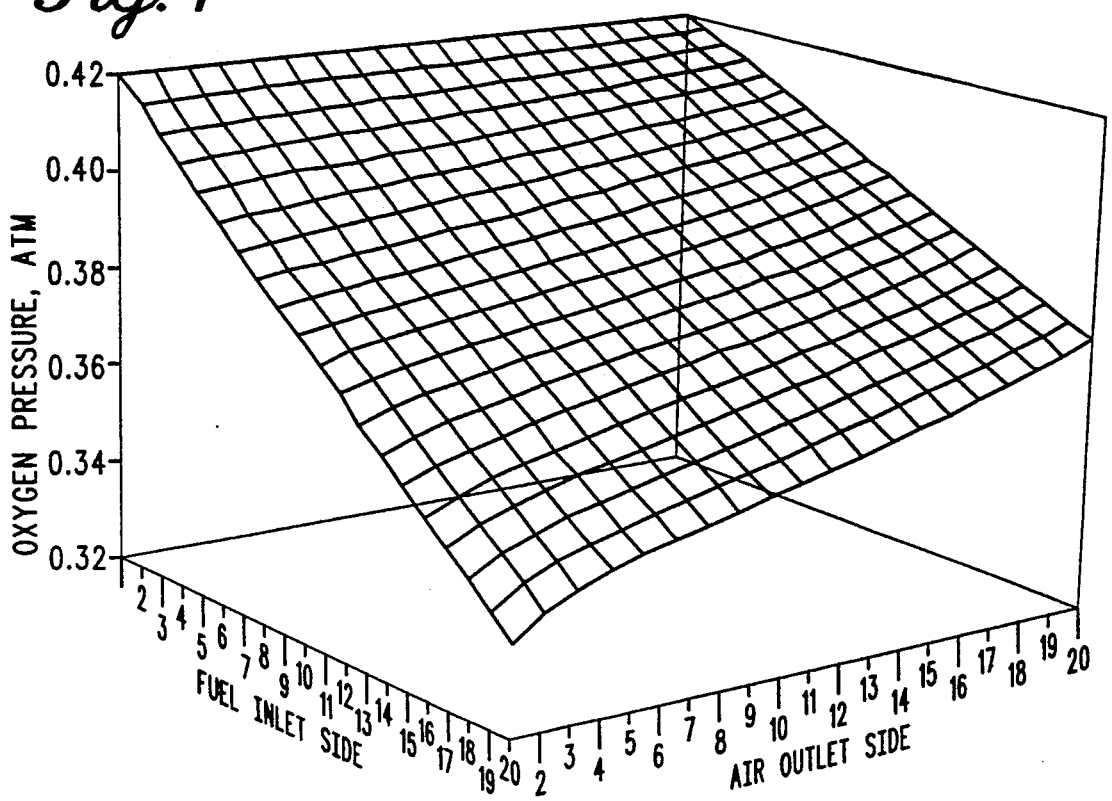
FIG. 7 illustrates the distribution of oxygen partial pressure across the area of the two-component solid oxide fuel cell.
Figure 8:
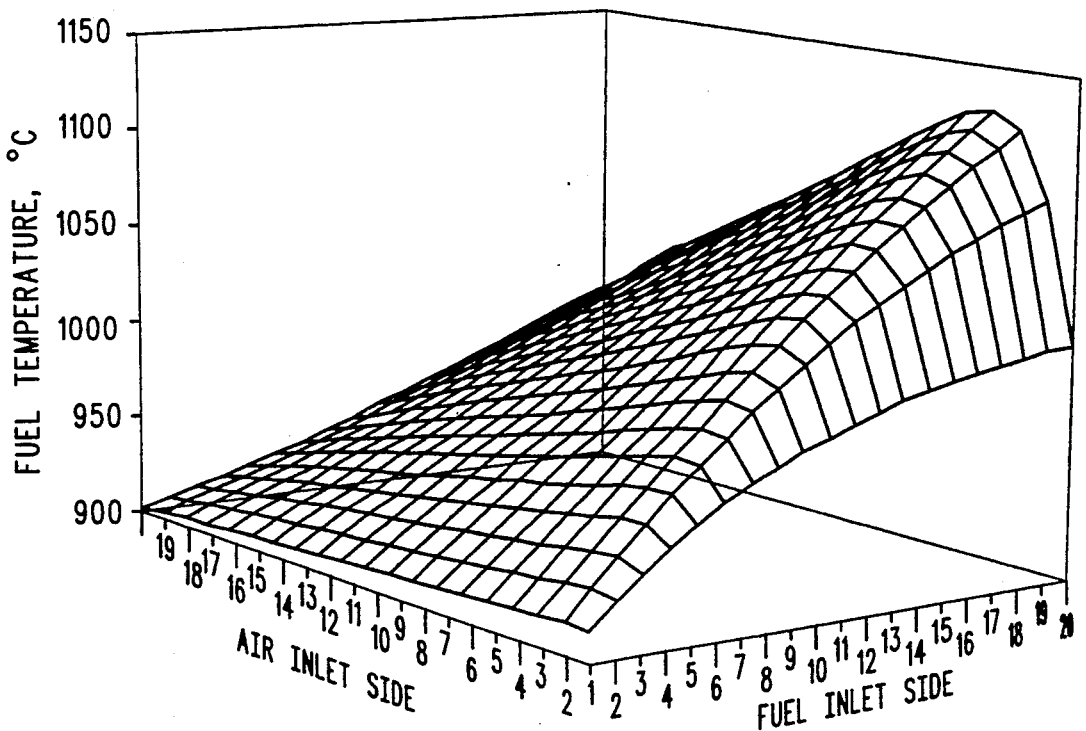
FIG. 8 illustrates the distribution of fuel stream temperature across the area of the two-component solid oxide fuel cell.
Figure 9:
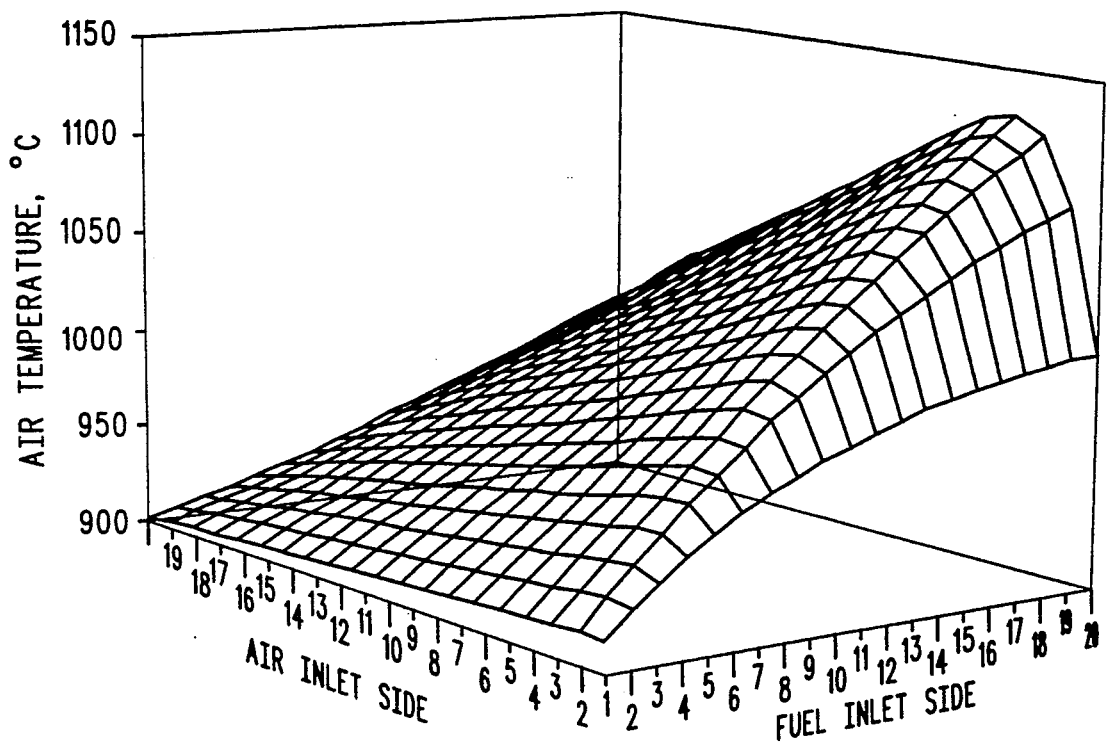
FIG. 9 illustrates the distribution of air stream temperature across the area of the two-component solid oxide fuel cell.

The calculated Nernst potential distribution across the fuel cell area is shown in FIG. 5, and the resulting local current density distribution is shown in FIG. 6. The oxygen utilization is illustrated by the plot of oxygen pressure distribution shown in FIG. 7. The air and fuel temperatures are plotted in FIGS. 8 and 9, respectively, for the case in question. The fuel cell design was not optimized in this series of calculations, e.g., the layer thickness, channel sizes, cell heights, etc., were not studied as variables. Only one case was calculated, and the fuel and air flows were adjusted to give the desired fuel utilization and average air outlet temperature. The performance of the two-component fuel cell would be quite satisfactory for most power source applications. The important advantages of this concept are its simplicity and ease of fabrication, and the stability of the electrode material in oxidizing and reducing environments and, possibly, in sulfur-containing fuels.

While preferred embodiments have been described herein, it will be clear to those skilled in the art that various changes and modifications can be made without departing from the invention in its broader aspects as set forth in the claims provided herein.

TABLE 1

Summary of Performance Calculated with the CROSSFLOW Fuel Cell Model.
Run Case: Two-Component FC Run 1.3

| GEOMETRIC INPUT DATA | cm |
|---|---|
| Electrolyte thickness, | 0.0025 |
| Anode thickness on electrolyte, | 0.0025 |
| Cathode thickness on electrolyte, | 0.0025 |
| Interconnect thickness, | 0.0025 |
| Anode thickness on interconnect, | 0.0025 |
| Cathode thickness on interconnect, | 0.0025 |
| Anode web thickness, | 0.0600 |
| Cathode web thickness, | 0.0600 |
| Anode web height, | 0.02 |

TABLE 1-continued

Summary of Performance Calculated with the CROSSFLOW Fuel Cell Model.
Run Case: Two-Component FC Run 1.3

| | |
|---|---|
| Cathode web height, | 0.03 |
| Anode web spacing, | 0.08 |
| Cathode web spacing, | 0.09 |
| Fuel edge length, | 10.00 |
| Oxidant edge length, | 10.00 = 154 cells |
| MATERIALS INPUT DATA | |
| Anode resistivity, ohm-cm | 0.5000E+00 |
| Cathode resistivity, ohm-cm | 0.5000E+00 |
| Interconnect resistivity, ohm-cm | 0.5000E+00 |
| Electrolyte resistivity, ohm-cm | 0.3685 plus 0.2838E-02 EXP(10300.0/T) |
| Anode interfacial resistance, ohm-cm$^2$ | 0.1000E+00 |
| Cathode interfacial resistance, ohm-cm$^2$ | 0.1000E+00 |
| Anode bulk density, g/cm3 | 4.165 |
| Cathode bulk density, g/cm3 | 4.606 |
| Electrolyte bulk density, g/cm3 | 5.831 |
| Interconnect bulk density, g/cm3 | 6.448 |
| PROCESS INPUT DATA | |
| Vol. fraction H2 in fuel inlet, | 0.660 |
| Fuel inlet temperature, C., | 900.00 |
| Fuel inlet pressure, atm | 2.000 |
| Fuel inlet flow, Std L/h-cm2, | 0.115 |
| Vol. fraction O2 in oxidant inlet, | 0.210 |
| Air inlet temperature, C., | 900.00 |
| Air inlet pressure, atm | 2.000 |
| Air inlet flow, Std L/h-cm2, | 1.200 |
| Cell operating voltage, V, | 0.7000 |
| OUTPUT DATA SUMMARY | |
| Fuel utilization, percent, | 87.086 |
| Overall fuel efficiency, percent, | 47.212 |
| Total cell power, Watts, | 11.080 (× 154 cells = 1.706 kW) |
| Total cell current, Amp, | 15.829 |
| Volume power density, kW/L, | 1.705 |
| Weight power density, kW/kg, | 0.484 |
| Air side pressure drop, atm, | 0.103244 |
| Fuel side pressure drop, atm, | 0.030689 |
| Cell bulk density, g/cm3, | 3.525 |
| Average air outlet temperature, C., | 1066.71 |
| Average fuel outlet temperature, C., | 947.01 |
| Waste sensible heat out of cell, W, | 9.054 |
| Waste heat out as unused H2, W,,, | 0.459E+01 |
| Average Nernst potential, V, | 0.8566 |

Appendix A

```
$LARGE
C------------------------------------------------+
C              This program has been developed by:      |
C                                                       |
C            The Electrochemical Technology Program     |
C                  Chemical Technology Division         |
C                   Argonne National Laboratory         |
C                     9700 South Cass Avenue            |
C                   Argonne, Illinois  60439-4837       |
C                                                       |
C            Contact: Dr. K. M. Myles, (708) 972-4329   |
C                                                       |
C                       PROGRAM EQFLOWXX                |
C                                                       |
C                                                       |
C        !!!!!!!!!!!!!!!!!!!!!!!!!!!!!!!!!!!!!!!!!!!!   |
C                                                       |
C        THIS PROGRAM IS NOT MEANT FOR GENERAL DISTRIBUT:.|
C                                                       |
C        !!!!!!!!!!!!!!!!!!!!!!!!!!!!!!!!!!!!!!!!!!!!   |
C                                                       |
C------------------------------------------------+
C
      IMPLICIT REAL*8 (A-H,O-Z)
      REAL*8 MWT(7)
      CHARACTER*40 CASE
```

```
      COMMON /R1/ DTE,DTI,DTAE,DTCE,DTAI,DTCI,WA,WC,HA,HC,XA,XC,
     *            DXN,DXM
      COMMON /R2/ RHOA,RHOC,RHOI,AA,BB,CC,RCIF,RAIF,POROE,POROA,
     *            POROC,POROI,DENSE,DENSA,DENSC,DENSI
      COMMON /R3/ ZFIN(7), XO2IN, TFUEL, TAIR, PFUEL, PAIR, V,
     *            ADDD, FDDD, IDIST
      COMMON /ZZ1/ QRES(21,51), QENT(21,51), RELEC(21,51),          !ZZ1
     *             TEL(21,51), RDEN(21,51), EN(21,51), CUR(21,51)
      COMMON /ZZ2/ MWT, GM, O2FLOW, A2FLOW, PH2, PO2, PH2O, TA, TF, !ZZ2
     *             PA, PF, ADELP, FDELP
      COMMON /ZZ3/ FUELDP, EFF2, WASTE, YFRIN, AVGMOLD, POWER, ID, DHF, !ZZ3
     *             AFL, FFL, PROUT, CPG, EFFIC, XF, GML, ZF, TOTWT,
     *             CURRENT, M, N, GMF, CASE, IAT, EXGM, UTILOX, XM,
     *             TOTVOL, EMIN, SCSA, EMAX, AVGM, IMIN, JMIN, IMAX,
     *             JMAX, AIRDP, TVG, TAVG, ZFR, DTDX, YFIN, TMIN, TFAVG,
     *             TFIN, GMOLSOUT, AVXM
C     ZF(1)=H2, ZF(2)=H2O, ZF(3)=CO, ZF(4)=CO2, ZF(5)=CH4, ZF(6)=O2, ZF(7)=N2
      DIMENSION ZF(7), ZFR(7), YFIN(7), YFRIN(7), ID(7), DHF(7), GMF(7),
     * EXGM(7), AVGM(7), GML(7), XM(7), XF(7), AVXM(7), CPG(7),
     * AVGMOLD(7), AFL(51), FFL(51)
      DIMENSION PH2(21,51), PO2(21,51), PH2O(21,51), TA(21,51),
     * TF(21,51), A2FLOW(21,51), O2FLOW(21,51), PA(21,51), PF(21,51),
     * ADELP(21,51), FDELP(21,51), GM(21,51,7)
!>>>>>
      DIMENSION GMOLSOUT(7), PROUT(7)
!<<<<<
      NAMELIST /INPUTDATA/ CASE,
     *                     DTE, DTI, DTAE, DTCE, DTAI, DTCI,
     *                     WA, HA, XA, WC, HC, XC,
     *                     DXN, DXM, N, M,
     *                     ZFIN, XO2IN, TFUEL, TAIR, PFUEL, PAIR,
     *                     RAIF, RCIF, APRNT, FPRNT, IDIST, V,
     *                     RHOA, RHOC, RHOI, AA, BB, CC,
     *                     DENSE, DENSA, DENSC, DENSI
C
      OPEN (7, FILE = 'EQFLOW.DAT', STATUS = 'OLD', BLOCKSIZE=512)
      OPEN (8, FILE = 'EQFLOW.OUT', BLOCKSIZE=512)
      OPEN (42,FILE = 'BALANCE.IT', BLOCKSIZE=512)
      REWIND 8
      REWIND 42
      DATA MWT/2.D0, 18.D0, 28.D0, 44.D0, 16.D0, 32.D0, 28 ./
      DATA (ID(I),I=1,7) /2, 5, 17, 18, 16, 22, 25/
      READ (7, NML=INPUTDATA)
10    FORMAT (2A40)
      ADDD = APRNT
      FDDD = FPRNT
      WRITE(*,9999)
9999  FORMAT(//////)
101   WRITE (*,102)
102   FORMAT (//'***********************************************************
     1*************',//)
      WRITE (*,103)
103   FORMAT(6X,'ELECTROCHEMICAL PERFORMANCE MODEL OF THE CROSS-FLOW'
     *    ,/6X,'       MONOLITHIC SOLID OXIDE FUEL CELL - MSOFC'///)
      WRITE (*,200)
200   FORMAT ('.            --- MAIN MENU FOR EQFLOW ---',/)
      WRITE (*,110)
110   FORMAT ('            1. VIEW/EDIT GEOMETRIC DATA.',
     *      /'            2. VIEW/EDIT MATERIALS DATA. ',
     *      /'            3. VIEW/EDIT PROCESS DATA.',
     *      /'            4. RUN THE CURRENT CASE.',
     *      /'            5. EXIT -EQFLOW-.',/)
      WRITE (*,102)
      WRITE (*,117)
117   FORMAT ('      Enter the desired menu item number :  ',\)
      READ (*,*) I
      IF (I.LT.1 .OR. I.GT.5) THEN
        WRITE (*,118)
118     FORMAT(/' Invalid Option. Please re-enter your option. ',\)
        GO TO 101
      ENDIF
      GO TO (1000,2000,3000,4000,9000),I
C*
C***************************************************************
C*      BEGINNING OF THE GEOMETRIC DATA INPUT SECTION.
C*
1000  CONTINUE
```

```
      CALL RD1 (CASE,N,M)
      WRITE (*,1015)
1015  FORMAT (' This finishes the Geometric data input.')
      GO TO 3500
C*
C***********************************************************************
C*       BEGINNING OF THE MATERIALS DATA INPUT SECTION.
C*
2000  WRITE (*,*)
      CALL RD2 (CASE)
      WRITE (*,*)
      WRITE (*,2010)
2010  FORMAT (' This finishes the Materials Properties data input.')
      GO TO 3500
C
C***********************************************************************
C*       BEGINNING OF PROCESS DATA INPUT SECTION.
C*
3000  CONTINUE
      TFUEL = TFUEL - 273.15D0
      TAIR  = TAIR  - 273.15D0
      CALL RD3 (CASE, M, N)
      TFUEL = TFUEL + 273.15D0
      TAIR  = TAIR  + 273.15D0
      WRITE (*,*)
      WRITE (*,3150)
3150  FORMAT (' This finishes the Process data input.')
C*
C***********************************************************************
C*       SAVING THE INPUT DATA TO "EQFLOW.DAT" FILE.
C*
3500  CONTINUE
      WRITE(7,'(A\)') '1 '
      WRITE(7, NML=INPUTDATA)
      WRITE (*,3550)
3550  FORMAT (' The new data set has been appended to EQFLOW.DAT.',//)
3560  FORMAT (' THIS DATA SET WAS EXECUTED')
      GO TO 101
C*
C***********************************************************************
C*       BEGINNING OF THE CASE CALCULATION SECTION.
C*
4000  WRITE (*,102)
      WRITE (7,3560)
CCC
      WRITE (*,4001)
4001  FORMAT (/' Need the distribution matrices in separate files?',
     *        /'        If yes enter 1. Else enter 0.       : ',\)
      READ (*,*) IAT
      IF (IAT .EQ. 1) WRITE (*,4002)
4002  FORMAT(' The matrices will be written in FOR05*.DAT',//)
CCC
CTTTTTTTTTTTTTTTTTTTTTTTTTTTTTTTTTTTTTTTTTTTTTTTTTTTTTTTTTTTTTTTTTTTTTT
      APRNT = ADDD
      FPRNT = FDDD
      DATA ICON, UTILSPEC, TMAXSPEC /2, 85.D0, 1323.15D0/
      FP1 = FPRNT
      AP1 = APRNT
      CALL FUELCELL (FP1, AP1, UTIL, TMAX)
      FPFUN1 = UTILSPEC - UTIL
      APFUN1 = TMAXSPEC - TMAX
      WRITE (*,5010) ICON, FP1, AP1, FPFUN1, APFUN1
5010  FORMAT(' I,FP,AP,FPFUN,APFUN:',I3,4F12.3)
      FP2 = 1.15*FPRNT
      AP2 = 1.15*APRNT
5050  CALL FUELCELL (FP2, AP2, UTIL, TMAX)
      FPFUN2 = UTILSPEC - UTIL
      APFUN2 = TMAXSPEC - TMAX
      WRITE (*,5010) ICON, FP2, AP2, FPFUN2, APFUN2
5000  ICON = ICON + 1
      FPP = (FP1*FPFUN2 - FP2*FPFUN1)/(FPFUN2 - FPFUN1)
      APP = (AP1*APFUN2 - AP2*APFUN1)/(APFUN2 - APFUN1)
      CALL FUELCELL (FPP, APP, UTIL, TMAX)
      FPFUN = UTILSPEC - UTIL
      APFUN = TMAXSPEC - TMAX
      WRITE (*,5010) ICON, FPP, APP, FPFUN, APFUN
      IF (DABS(FPFUN).LE.0.01D0 .AND. DABS(APFUN).LE.0.01D0) GO TO 6000
      IF (ICON.GT.25) STOP 'ICON GREATER THAN 25'
```

```
          IF (DABS(FPP-FP1) .GT. DABS(FPP-FP2)) THEN
            FP1 = FPP
            FPFUN1 = FPFUN
          ELSE
            FP2 = FPP
            FPFUN2 = FPFUN
          ENDIF
          IF (DABS(APP-AP1) .GT. DABS(APP-AP2)) THEN
            AP1 = APP
            APFUN1 = APFUN
          ELSE
            AP2 = APP
            APFUN2 = APFUN
          ENDIF
          IF (DABS(FP1-FP2)/DABS(AP1-AP2) .GT. 1.D3)   THEN
             AP2 = 1.12*AP1
             GO TO 5050
          ENDIF
          IF (DABS(FP1-FP2)/DABS(AP1-AP2) .LT. 1.D-3)  THEN
             FP2 = 1.12*FP1
             GO TO 5050
          ENDIF
          GO TO 5000
CTTTTTTTTTTTTTTTTTTTTTTTTTTTTTTTTTTTTTTTTTTTTTTTTTTTTTTTTTTTTTTTTTTTTTTT
*
*   PRINT THE OUTPUT DATA.
*
6000  WRITE (*,6001)
6001  FORMAT (' Output data being written to file.',
     *        /,' To print data, exit EQFLOW and print EQFLOW.OUT.',
     *        ' Runs appear in sequence.',//)
      WRITE (8,6010) CASE
6010  FORMAT ('1Run case: ',1X,A40)
      WRITE (8,6020)
6020  FORMAT ('0GEOMETRIC INPUT DATA                    cm')
      WRITE (8,6030) DTE,DTAE,DTCE,DTI,DTAI,DTCI,WA,WC,HA,HC,XA,XC,
     *  DXN,DXM
6030  FORMAT (' Electrolyte thickness                  ',F8.4,
     *      /,' Anode thickness on electrolyte         ',F8.4,
     *      /,' Cathode thickness on electrolyte       ',F8.4,
     *      /,' Interconnect thickness                 ',F8.4,
     *      /,' Anode thickness on interconnect        ',F8.4,
     *      /,' Cathode thickness on interconnect      ',F8.4,
     *      /,' Anode web thickness                    ',F8.4,
     *      /,' Cathode web thickness                  ',F8.4,
     *      /,' Anode web height                       ',F8.2,
     *      /,' Cathode web height                     ',F8.2,
     *      /,' Anode web spacing                      ',F8.2,
     *      /,' Cathode web spacing                    ',F8.2,
     *      /,' Fuel edge length                       ',F8.2,
     *      /,' Oxidant edge length                    ',F8.2)
      WRITE (8,6170)
6170  FORMAT ('0MATERIALS INPUT DATA')
      WRITE (8,6180) RHOA,RHOC,RHOI,AA,BB,CC,RAIF,RCIF,DENSA,DENSC,
     *   DENSE,DENSI
6180  FORMAT (' Anode resistivity, ohm-cm              ',E10.4,
     *      /,' Cathode resistivity, ohm-cm            ',E10.4,
     *      /,' Interconnect resistivity, ohm-cm       ',E10.4,
     *      /,' Electrolyte resistivity, ohm-cm',
     *      /, 13X,E10.4,' + ',E10.4,' EXP(',F8.1,'/T)',
     *      /,' Anode interfacial resistance, ohm-cm2  ',E10.4,
     *      /,' Cathode interfacial resistance, ohm-cm2',E10.4,
     *      /,' Anode bulk density, g/cm3              ',F8.3,
     *      /,' Cathode bulk density, g/cm3            ',F8.3,
     *      /,' Electrolyte bulk density, g/cm3        ',F8.3,
     *      /,' Interconnect bulk density, g/cm3       ',F8.3)
      WRITE (8,6270)
6270  FORMAT ('0PROCESS INPUT DATA')
      WRITE (8,6280) (ZFIN(K),K=1,7)
6280  FORMAT (' Gas mole fractions in fuel feed : ',/,'   H2 = ',F5.3,
     *'   H2O = ',F5.3,'   CO = ',F5.3,'   CO2 = ',F5.3,'   CH4 = ',F5.3,
     */'   O2 = ',F5.3,'   N2 = ',F5.3)
      WRITE (8,6290) TFUEL-273.15, TFIN-273.15, PFUEL, FPP, XO2IN,
     *                TAIR-273.15, PAIR, APP, V
6290  FORMAT (' Fuel temperature at manifold inlet, C  ',F8.2,
     *      /,' Fuel temperature at stack inlet, C     ',F8.2,
     *      /,' Fuel inlet pressure, atm               ',F8.3,
```

```
     *         /,' Fuel inlet flow, Std L/h                       ',F8.3,
     *         /,' Vol. fraction O2 in oxidant inlet              ',F8.3,
     *         /,' Air inlet temperature, C                       ',F8.2,
     *         /,' Air inlet pressure, atm                        ',F8.3,
     *         /,' Air inlet flow, Std L/h                        ',F8.3,
     *         /,' Cell operating voltage, V                      ',F8.4)
       AIRPUMP = 0.03127*A*P*(APP*TAIR /298.)/0.6
       FULPUMP = 0.03127*FUELDP*(FPRNT*TFUEL/298.)/0.6
       WRITE (8,6370)
 6370  FORMAT ('0OUTPUT DATA SUMMARY')
       WRITE (8,6380) UTIL, UTILOX, EFFIC, EFF2, POWER, CURRENT,
     *      POWER/TOTVOL, POWER/TOTWT, AIRDP, FUELDP, TOTWT/TOTVOL
 6380  FORMAT (' Fuel utilization, percent                        ',F8.3,
     *         /,' Oxygen utilization, percent                    ',F8.3,
     *         /,' Fuel efficiency based on total fuel, percent   ',F8.3,
     *         /,' Fuel efficiency based on spent fuel, percent   ',F8.3,
     *         /,' Total cell power, Watts                        ',F8.3,
     *         /,' Total cell current, Amp                        ',F8.3,
     *         /,' Volume power density, kW/L                     ',F8.3,
     *         /,' Weight power density, kW/kg                    ',F8.3,
     *         /,' Air side pressure drop, atm                    ',F9.6,
     *         /,' Fuel side pressure drop, atm                   ',F9.6,
     *         /,' Cell bulk density, g/cm3                       ',F8.3)
C
       RDENS = 0.0D0
       DO 6625 I=2,N
       DO 6625 J=2,M
 6625  RDENS = RDENS + RDEN(I,J)
       RDENS = RDENS/((M-1)*(N-1).)
       AVGNRN = 0.0D0
       DO 6700 I=2,N
       DO 6700 J=2,M
 6700  AVGNRN = AVGNRN + EN(I,J)
       AVGNRN = AVGNRN/(N - 1)/(M - 1)
       CURMAX = 0.0D0
       CURMIN = 999.0D0
       DO 4599 J=2,M
       DO 4599 I=2,N
       IF (CUR(I,J) .LT. CURMIN) CURMIN = CUR(I,J)
       IF (CUR(I,J) .GT. CURMAX) CURMAX = CUR(I,J)
 4599  CONTINUE
       CURMIN = CURMIN*1.D3/SCSA
       CURAVG = POWER *1.D3/(DXM*DXN*V)
       CURMAX = CURMAX*1.D3/SCSA
       POWNET = POWER - AIRPUMP - FULPUMP
       PERNET = (AIRPUMP + FULPUMP) * 100.D0/POWER
       WRITE (8,6710) TAVG,TFAVG,WASTE,RDENS,TMIN-273.15,IMIN,JMIN,
     *      TMAX-273.15,IMAX,JMAX,TVG,DTDX,EMIN,AVGNRN,EMAX,
     *      CURMIN,CURAVG,CURMAX,POWNET,PERNET
 6710  FORMAT(' Average air outlet temperature, C                 ',F8.2,
     *         /,' Average fuel outlet temperature, C             ',F8.2,
     *         /,' Waste sensible heat out of cell, W             ',F8.3,
     *         /,' Area Specific Resistance, Ohm-cm^2             ',G11.5,
     *         /,' Min Temperature, C = ',F9.2,5X,'at I=',I2,2X,'& J=',I2,
     *         /,' Max Temperature, C = ',F9.2,5X,'at I=',I2,2X,'& J=',I2,
     *         /,' Average Cell Temperature, C                    ',G11.5,
     *         /,' Maximum temperature gradient, C/cm             ',G11.5,
     *         /,' Nernst Potential: Min, Avg and Max >           ',3F9.4,
     *         /,' Current Density: Min, Avg and Max >            ',3F9.2,
     *         /,' Net Power, W                                   ',F8.2,
     *         /,' Pumping losses as % of total power             ',F8.2)
 6760  FORMAT(' Max Temperature, C = ',F9.2,5X,'at I=',I2,2X,'& J=',I2)
C
       AVGRES = 0.0
       DO 9092 I=2,N
       DO 9092 J=2,M
 9092  AVGRES = AVGRES + RELEC(I,J)
       AVGRES = AVGRES/(N - 1)/(M - 1)
       WRITE (8,4312)
 4312  FORMAT('1ELECTROLYTE TEMPERATURE MATRIX')
       DO 9910 I=2,N
 9910  WRITE (8,4310) (TEL(I,J)-273.15,J=2,M)
 4310  FORMAT (20F6.0)
       WRITE (8,4318)
 4318  FORMAT ('1OXYGEN PRESSURE MATRIX')
       DO 9922 I=2,N
 9922  WRITE (8,4330) (PO2(I,J), J=2,M)
```

```fortran
      WRITE (8,4322)
4322  FORMAT ('1HYDROGEN PRESSURE MATRIX')
      DO 9930 I=2,N
9930  WRITE (8,4330) (PH2(I,J), J=2,M)
      WRITE (8,4317)
4317  FORMAT ('1NERNST POTENTIAL MATRIX')
      DO 9925 I=2,N
9925  WRITE (8,4320) (EN(I,J), J=2,M)
4320  FORMAT (20F6.3)
      WRITE (8,4325)
4325  FORMAT ('1CURRENT DENSITY MATRIX')
      DO 9935 I=2,N
9935  WRITE (8,4330) (CUR(I,J)/SCSA, J=2,M)
4330  FORMAT (20F6.3)
      WRITE (8,4335)
4335  FORMAT('1HYDROGEN FLOW, GM/SEC')
      DO 9940 I=2,N
9940  WRITE (8,4340) (GM(I,J,1), J=2,M)
4340  FORMAT(12G10.3)
      WRITE (8,*)
      WRITE (8,4360) ((GM(I,M,K), K=1,7), I=2,N)
4360  FORMAT (7G15.6)
      DO 4341 K=1,7
      EXGM(K) = 0.0D0
      DO 4341 I=2,N
4341  EXGM(K) = EXGM(K) + GM(I,M,K)/MWT(K)
      EXGMT = EXGM(1)+EXGM(2)+EXGM(3)+EXGM(4)+EXGM(5)+EXGM(6)+EXGM(7)
      DO 4342 K=1,7
4342  GMF(K) = EXGM(K)/EXGMT
      WRITE (8,4361) (EXGM(K)*3600.D0,K=1,7), (GMF(K),K=1,7)
4361  FORMAT (' Products exiting with anode stream, Gmols/hr:',
     *          /5x, 7g15.5,/,
     *        ' Mole Fractions of components in exit anode stream:',
     *          /5x, 7g15.5)
4600  CONTINUE
C
C*
C*    BEGINNING OF THE OUTPUT DATA REVIEW SECTION.
C*
7000  WRITE (*,7001)
7001  FORMAT (///18x,' Review of selected output data.',/)
      WRITE (*,7010) EFFIC, EFF2, UTIL, UTILOX, AIRDP,FUELDP,
     * TAVG,TFAVG, POWER,POWNET, EMIN,AVGNRN,EMAX, CURMIN,CURAVG,CURMAX,
     * TMIN-273.15,TVG,TMAX-273.15, DTDX
7010  FORMAT (' Effic: all fuel, %   =', F8.2,6x,
     *        ' Effic: spent fuel,% =', F8.2,
     *      /,' Fuel utilization, % = ',F8.2,6x,
     *        ' O_2 utilization, %  = ', F8.2,
     *      /,' Air Delta P, atm    = ',F7.5,7x,
     *        ' Fuel Delta P, atm   = ',F7.5,
     *      /,' Air outlet T, C     = ',F8.2,6x,
     *        ' Product outlet T, C = ',F8.2,
     *      /,' Total power, W      = ',F8.2,6x,
     *        ' Net Power, W        = ',F8.2,
     *      /,' Nernst Potential: Min, Avg and Max >',3F9.4,
     *      /,' Current density : Min, Avg and Max >',3F9.2,
     *      /,' Cell temperature: Min, Avg and Max >',3F9.2,
     *      /,' Maximum dT/dx, C/cm                =', F9.2)
      WRITE (*,102)
      WRITE (*,1002)
1002  FORMAT (' Press RETURN to go to the main menu.   ',\)
      CALL PROMPT
      GO TO 101
C
9000  STOP
      END
C************************************************************************
      SUBROUTINE CALDF (TEMPE, AVPH2, AVPO2, AVPH2O, IFLAG, DF)
      IMPLICIT REAL*8 (A-H,O-Z)
      IF (AVPH2.LE.0.0D0 .OR. AVPO2.LE.0.0D0) THEN
      DF = (-5.8792D4 + 1.2728D1*TEMPE + 2.2293D-4*TEMPE*TEMPE)*4.184D0
      RETURN
      ENDIF
      IF (AVPH2O .LE. 0.0D0) THEN
      WRITE (*,9999)
9999  FORMAT(//' WARNING: Water partial pressure is zero. ',
     &       /' Existing relation for Gibbs Free Energy change',
     &       /' will result in overflow. Aborting ...')
```

```
      CALL PROMPT
      IFLAG = 1
      RETURN
      ENDIF
      DF = (-5.8792D4 + 1.2728D1*TEMPE + 2.2293D-4*TEMPE*TEMPE)*4.184D0
     &    - 8.314D0 * TEMPE * DLOG(AVPH2*DSQRT(AVPO2)/AVPH2O)
      RETURN
      END

C***********************************************************************
$LARGE
      SUBROUTINE FUELCELL (FPRNT, APRNT, UTIL, TMAX)
      IMPLICIT REAL*8 (A-H, O-Z)
      REAL*8 MWT(7)
      CHARACTER*40 CASE
      COMMON /R1/ DTE,DTI,DTAE,DTCE,DTAI,DTCI,WA,WC,HA,HC,XA,XC,
     *            DXN,DXM
      COMMON /R2/ RHOA,RHOC,RHOI,AA,BB,CC,RCIF,RAIF,POROE,POROA,
     *            POROC,POROI,DENSE,DENSA,DENSC,DENSI
      COMMON /R3/ ZFIN(7), XO2IN, TFUEL, TAIR, PFUEL, PAIR, V,
     *            ADDD, FDDD, IDIST
      COMMON /ZZ1/ QRES(21,51), QENT(21,51), RELEC(21,51),          !ZZ1
     *             TEL(21,51), RDEN(21,51), EN(21,51), CUR(21,51)
      COMMON /ZZ2/ MWT, GM, O2FLOW, A2FLOW, PH2, PO2, PH2O, TA, TF, !ZZ2
     *             PA, PF, ADELP, FDELP
      COMMON /ZZ3/ FUELDP, EFF2, WASTE, YFRIN, AVGMOLD, POWER, ID, DHF, !ZZ3
     *             AFL, FFL, PROUT, CPG, EFFIC, XF, GML, ZF, TOTWT,
     *             CURRENT, M, N, GMF, CASE, IAT, EXGM, UTILOX, XM,
     *             TOTVOL, EMIN, SCSA, EMAX, AVGM, IMIN, JMIN, IMAX,
     *             JMAX, AIRDP, TVG, TAVG, ZFR, DTDX, YFIN, TMIN, TFAVG,
     *             TFIN, GMOLSOUT, AVXM
C     ZF(1)=H2, ZF(2)=H2O, ZF(3)=CO, ZF(4)=CO2, ZF(5)=CH4, ZF(6)=O2, ZF(7)=N2
      DIMENSION ZF(7), ZFR(7), YFIN(7), YFRIN(7), ID(7), DHF(7), GMF(7),
     * EXGM(7), AVGM(7), GML(7), XM(7), XF(7), AVXM(7), CPG(7),
     * AVGMOLD(7), AFL(51), FFL(51)
      DIMENSION PH2(21,51), PO2(21,51), PH2O(21,51), TA(21,51),
     * TF(21,51), A2FLOW(21,51), O2FLOW(21,51), PA(21,51), PF(21,51),
     * ADELP(21,51), FDELP(21,51), GM(21,51,7)
!>>>>>
      DIMENSION GMOLSOUT(7), PROUT(7)
!<<<<<
C
1000  SC = DXM/(M-1)              !Node width in cathode also Node length in anode
      SA = DXN/(N-1)              !Node width in anode also Node length in cathode
      ANCH = (DXM-WC)/(WC+XC)     !No. of air channels in cathode layer
      FNCH = (DXN-WA)/(WA+XA)     !No. of fuel channels in anode layer
      ADDD = APRNT
      FDDD = FPRNT
      AFLOW = APRNT*TAIR/(3.6D0*273.15D0*PAIR)   !cm^3/s air into cathode layer
      FFLOW = FPRNT*TFUEL  /(3.6D0*273.15D0*PFUEL) !cm^3/s fuel into anode layer
C
C     Calculate the equilibrium composition of the fuel feed mixture at the
C     stack inlet temperature (i.e. at TFUEL). The volumetric flow rate FFLOW
C     under equilibrium conditions is adjusted by the factor YTIN.
C
C     CALL EQCOMP (7, ZFIN, TFUEL, YFIN, YTIN, YFRIN) !YFIN(k)=gmols
      CALL EQNEW (ZFIN, TFUEL, YFIN, YTIN, YFRIN) !YFIN(k)=gmols
      TFIN = TFUEL
      FFLOW = FFLOW * YTIN                !YTIN=Total gmols in; YFRIN(k)=Mol.frac.
C!>>>>>
      ZAIR = APRNT/22.4D0
      ZGAS = FPRNT*YTIN/22.4D0
      ZMASSIN = ZAIR*28.84 + ZGAS * (YFRIN(1)*2.D0 + YFRIN(2)*18.D0
     &          + YFRIN(3)*28.D0 + YFRIN(4)*44.D0 + YFRIN(5)*16.D0
     &          + YFRIN(6)*32.D0 + YFRIN(7)*28.D0)
      DO 10000 K=2,5
      CALL DELHF (TFIN, ID(K), DHF(K))
10000 DHF(K) = -DHF(K)*4.184D0
      ENERGYIN = ZGAS * (YFRIN(1)*DHF(2) + YFRIN(3)*(DHF(4) - DHF(3))
     &          + YFRIN(5)*(DHF(4) + 2.D0*DHF(2) - DHF(5))  )
      REWIND 42
      WRITE (42,10001) ZAIR, ZGAS, AFLOW*3.6D3, FFLOW*3.6D3, YTIN,
     &    (YFRIN(K),K=1,5), (YFRIN(K)*ZGAS,K=1,5), ZMASSIN, ENERGYIN
10001 FORMAT( /2X,' Gmols of air in per hr.            = ', G15.6,
     &        /2x,' Gmols of equilibrium fuel in per hr. = ', G15.6,
     &        /2x,' AFLOW * 3600, cm^3/hr               = ', G15.6,
     &        /2x,' FFLOW * 3600, cm^3/hr               = ', G15.6,
```

```
                &        /2x,' Mole ratio of after to before equil. = ', G15.6,
                &        /2x,' Mole Fractions of gases entering: ', /5G15.6,
                &        /2x,' Gmols/hr of the gases entering:   ', /5G15.6,
                &        /2x,' Total mass in, gm/hr              = ', G15.6,
                &        /2X,' Total Energy - Chemical Energy, J/hr = ', G15.6)
C!<<<<<
C
C     The volumetric flow rate through each node, depending on the type of feed
C     flow distribution.
C
C!Uniform distribution
         DO 4004 J=2,M
4004     AFL(J) = AFLOW/(M-1)
         DO 4005 I=2,N
4005     FFL(I) = FFLOW/(N-1)
C
C     Initialize for Maximum/Minimum values.
C
         TMIN = DMIN1(TFIN,TAIR)
         IMIN = 1
         JMIN = 1
         EMIN = 1.D11
         TMAX = 0.0D0
         EMAX = 0.0D0
C
C     Some geometric constants.
C
         SCSA = SC*SA
         ANCN = ANCH/(M-1)                    !ANCN = No. of air channels per node
         ANW  = (ANCH+1)/(M-1)                !ANW  = No. of cathodic webs per node
         FNCN = FNCH/(N-1)                    !FNCN = No. of fuel channels per node
         FNW  = (FNCH+1)/(N-1)                !FNW  = No. of anodic webs per node
C
C     Weight and volume of cell layer
C
         WEIGHT = XA*WC*HC*DENSC + XC*WA*HA*DENSA + XC*XA*((DTCI +
     1        DTCE)*DENSC + (DTAI + DTAE)*DENSA + DTE*DENSE + DTI*DENSI)
         TOTVOL = DXM*DXN*(DTI + DTCI + HC + DTCE + DTE + DTAE + HA + DTAI)

DTI* DENSI                              DENSE

TOTWT = DXM*DXN*DTI  ISI          + DXM*DXN*DTE*DEN!
     *         + DXM*DXN*(DTCI+DTCE)*DENSC  + DXM*DXN*(DTAE+DTAI)*DENSA
     *         + (ANCH+1)*DXN*WC*HC*DENSC   + (FNCH+1)*DXM*WA*HA*DENSA
C
C     Resistances through cathode layer
C
         CALL RESIST (1900, DTCE, XC, WC, SA, RHOC, RCAB)
         RCBC = RHOC*HC/(WC*SA)
         CALL RESIST (1900, DTCI, XC, WC, SA, RHOC, RCCD)
         RCAD = RCAB + RCBC + RCCD
         RCT  = ANW / RCAD
         RCT  = 1.0D0 / RCT
C
C     Resistances through anode layer
C
         CALL RESIST (1900, DTAE, XA, WA, SC, RHOA, RAAB)
         RABC = RHOA*HA/(WA*SC)
         CALL RESIST (1900, DTAI, XA, WA, SC, RHOA, RACD)
         RAAD = RAAB + RABC + RACD
         RAN  = FNW / RAAD
         RAN  = 1.0D0 / RAN
C
C     Resistances of all layers and interfaces, except electrolyte layer
C
         RI   = RHOI * DTI / SCSA
         RIF  = (RAIF + RCIF) / SCSA
         RESIS = RCT + RAN + RI + RIF
*
*     INTERNAL HEAT TRANSFER AND PRESSURE DROP DATA SECTION.
*
         CPA  = 1.175D0                          !J/gm-K
         HAIR = 3.D0 * 7.29D-04 * (XC + HC) / (2.D0 * XC * HC)
         XKIC = 0.04D0 / (DTI + DTAI + DTCI)
         AVISC = 4.48D-04
*
*     SET CONDITIONS IN THE FIRST ROW OF NODES (INLET REGION). .
*     FIRST THE AIR INLET REGION.
*
```

```
        CD1 = (273.15D0 * PAIR / (TAIR*22400.0D0)) * XO2IN*32.D0
        CD2 = (273.15D0 * PAIR / (TAIR*22400.0D0)) * (1.D0-XO2IN)*28.D0
        DO 4200 J=2,M
        O2FLOW(1,J) = AFL(J) * CD1                      !gm/s-node
        A2FLOW(1,J) = AFL(J) * CD2                      !gm/s-node
        PO2(1,J) = PAIR * XO2IN
        PA(1,J) = PAIR
        TA(1,J) = TAIR
 4200   CONTINUE
*
*  CONDITIONS IN THE FUEL INLET REGION.
*
        CD1 = 273.15D0*PFUEL / (TFIN*22400.D0)
        DO 4210 I=2,N
        CD2 = FFL(I) * CD1
        DO 4209 K=1,7
 4209   GM(I,1,K) = CD2 * YFRIN(K) * MWT(K)             !gm/s-node
        PH2(I,1) = PFUEL * YFRIN(1)
        PH2O(I,1) = PFUEL * YFRIN(2)
        PF(I,1) = PFUEL
        TF(I,1) = TFIN
 4210   CONTINUE
C
        WRITE (*,*)
        WRITE (*,'(A\)') ' Computing ...'
        TD = TAIR
        CONST1 = 12.D0 + 16.6D0/( (XC/HC)**1.5 )
        CONST1 = CONST1/XC/(HC**3)
        CONST2 = 12.D0 + 16. 20/( (XA/HA)**1.5 )
        CONST2 = CONST2/XA/(HA**3)
        IFLAG = 0
CLLLLLLLLLLLLLLLLLLLLLLLLLLLLLLLLLLLLLLLLLLLLLLLLLLLLLLLLLLLLLLLLLLL
*
*  START OF THE CORE NODE CALCULATIONS
*
        DO 4300 I=2,N
C       WRITE (*,'(A\)') '+.'
        WRITE (*,9089) I
 9089   FORMAT (I3,\)
C!9089  FORMAT ('I=',I2,\)
        DO 4300 J=2,M
C       WRITE (*,9090) J
C9090   FORMAT (I2,\)
        J1 = J-1
        I1 = I-1
 4301   ILOOP = 0
C!      IS = 0
        EQHT = 0.0D0
        AVPA = PA(I1,J)
        AVPF = PF(I,J1)
        AVPH2 = PH2(I,J1)
        AVPH2O = PH2O(I,J1)
        AVPO2 = PO2(I1,J)
        DO 4304 K=1,7
 4304   AVGMOLD(K) = GM(I,J1,K)
        GMTJ1 = GM(I,J1,1) + GM(I,J1,2) + GM(I,J1,3) + GM(I,J1,4)
     *        + GM(I,J1,5) + GM(I,J1,6) + GM(I,J1,7)
        CALL CPGAS3 (TF(I,J1), CPG)
        CPFJ1 = 0.0D0
        DO 4314 K=1,7
 4314   CPFJ1 = CPFJ1 + (GM(I,J1,K)/GMTJ1) * CPG(K)/MWT(K)
        CPFJ1 = CPFJ1 * 4.184D0
        AVO2FLOW = O2FLOW(I1,J)
        AVA2FLOW = A2FLOW(I1,J)
        TF(I,J) = TF(I,J1)
        TA(I,J) = TA(I1,J)
        TEMPE = TA(I1,J)
        AVTF = TF(I,J1)
        AVTA = TA(I1,J)
        TOTFIN = GM(I,J1,1) + GM(I,J1,2) + GM(I,J1,3)
     *         + GM(I,J1,4) + GM(I,J1,5) + GM(I,J1,6) + GM(I,J1,7)
        TOTFOUT= TOTFIN * 1.1D0    !The factor 1.1 is an estimate of OUT/IN
        TOTAIN = A2FLOW(I1,J) + O2FLOW(I1,J)    !Total air in, gm/sec-node
        TOTAOUT= TOTAIN * 0.996D0  !The factor .996 is an estimate of OUT/IN
 4305   ILOOP = ILOOP + 1
        ISAFETY = 1
C
```

```
C       Average mass fractions of anode stream for calculating mixture
C       properties.
C
        TAVGMO = AVGMOLD(1) +AVGMOLD(2) +AVGMOLD(3) +AVGMOLD(4)
     *          +AVGMOLD(5) +AVGMOLD(6) +AVGMOLD(7)
        DO 4306 K=1,7
4306    XM(K) = AVGMOLD(K)/TAVGMO                        !Mass frac (avg)
        CALL CPGAS3 (AVTF, CPG)
        CPF = 0.0D0
        DO 4350 K=1,7
4350    CPF = CPF + CPG(K)*XM(K)/MWT(K)
        CPF = CPF * 4.184D0                              !J/g-K
        FUELK = XM(1)*4.73D-3 + XM(2)*9.34D-4 + XM(3)*3.05D-4 !from files & McAdams
     *        + XM(4)*3.96D-4 + XM(5)*8.5D-4 + XM(6)*4.97D-4 + XM(7)*3.25D-4
        HF = 3.0D0 * FUELK * (XA + HA) / (2.D0 * XA * HA)
        HU = 1.D0/(1.D0/HAIR + 1.D0/HF + 1.D0/XKIC)
C                       OR.
        IF (AVPH2.LE.0.0C  .OR.  AVPO2.LE.0.0D0) THEN
          IF (AVPH2 .LE. 0.0D0) AVPH2 = 0.0D0
          IF (AVPO2 .LE. 0.0D0) AVPO2 = 0.0D0
          EN(I,J) = 0.0D0
          CUR(I,J) = 0.0D0
          Q = 0.0D0
          GO TO 4385
        ENDIF
C
4380    CONTINUE
C
C       Nernst potential
C
        CALL CALDF (TEMPE, AVPH2, AVPO2, AVPH2O, IFLAG, DF)
        IF (IFLAG .EQ. 1) STOP 'AVPH2O = 0.0 IN DEL-G CORRELATION 1'
        EN(I,J) = -DF/193000.D0
C
C       Resistance in electrolyte layer
C
        RHOE = AA + BB * EXP (CC/TEMPE)
        RE = RHOE * DTE / SCSA
        RELEC(I,J) = RE
        R = RESIS + RE
        RDEN(I,J) = R*SCSA
C
C       Current produced
C
        CUR(I,J) = (EN(I,J) - V) / R
        IF (CUR(I,J).LT.0.) CUR(I,J) = 0.D0
*
*   BEGINNING OF THE HEAT TRANSFER SECTION
*
        DH = (-5.6946D4 - 3.1659D0*TEMPE + 1.0175D-3*TEMPE*TEMPE
     &        - 1.1753D-7*TEMPE**3) * 4.184D0
        CALL CALDF (TEMPE, AVPH2, AVPO2, AVPH2O, IFLAG, DF)
        IF (IFLAG .EQ. 1) STOP 'AVPH2O = 0.0 IN DEL-G CORRELATION (2)'
        Q = (CUR(I,J)**2)*R + ((-DH) - (-DF)) * CUR(I,J)/193000.D0   !J/sec
4385    TEMPE = (Q/SCSA + HAIR*AVTA + HF*AVTF)/(HAIR + HF)
C
        DDD1 = TOTAIN*CPA*(TA(I1,J) - TD) + TOTAOUT*CPA*TD
     *         + SCSA*HAIR*( TEMPE - 0.5D0*TA(I1,J) )
     *         + SCSA*HU  *( AVTF  - 0.5D0*TA(I1,J) )
        TAN = DDD1/(TOTAOUT*CPA + 0.5D0*SCSA*HAIR + 0.5D0*SCSA*HU)
        QATEST = DABS(TAN - TA(I,J))
        IF (ISAFETY .EQ. 1) FAC1 = 2.0
        IF (ISAFETY .GT. 1) FAC1 = DSQRT(FAC1)
        TA(I,J) = TA(I,J) + FAC1*(TAN - TA(I,J))
        AVTA = 0.5D0 * (TA(I1,J) + TA(I,J))
C
        TEMPE = (Q/SCSA + HAIR*AVTA + HF*AVTF)/(HAIR + HF)
C
        DDD1 = TOTFIN*CPFJ1*(TF(I,J1) - TD) + TOTFOUT*CPF*TD
     *         + EQHT + SCSA*HF*( TEMPE - 0.5D0*TF(I,J1) )
     *         + SCSA*HU*( AVTA  - 0.5D0*TF(I,J1) )
        TFN = DDD1/(TOTFOUT*CPF + 0.5D0*SCSA*HF + 0.5D0*SCSA*HU)
        QFTEST = DABS(TFN - TF(I,J))
        IF (ISAFETY .EQ. 1) FAC2 = 4.0
        IF (ISAFETY .GT. 1) FAC2 = DSQRT(FAC2)
        TF(I,J) = TF(I,J) + FAC2*(TFN - TF(I,J))
```

```
        AVTF = 0.5D0 * (TF(I,J1) + TF(I,J))
C
        TEMPEN = (Q/SCSA + HAIR*AVTA + HF*AVTF)/(HAIR + HF)
        QETEST = DABS (TEMPEN - TEMPE)
        TEMPE = TEMPEN
        TEL(I,J)= TEMPE
C
        ISAFETY = ISAFETY + 1
        IS = IS + 1
        IF (ISAFETY .GT. 1900) WRITE (*,*) 'TF,TA,TE:', TFN, TAN, TEMPE
        IF (ISAFETY .GT. 2000) THEN
          WRITE (*,4351) I,J
          WRITE (7,4351) I,J
          WRITE (8,4351) I,J
4351      FORMAT (/' HEAT TRANSFER CALCULATIONS NOT CONVERGED AFTER',
     *            ' 2000 ITERATIONS AT (', I2, ',', I2, ').',
     *            /' ABORTING JOB.',//)
          WRITE (*,1002)
          CALL PROMPT
          STOP 'ISAFETY NOT CONVERGED AFTER 2000 ITERATIONS (3)'
        ENDIF
1002    FORMAT (' Press RETURN to go to the main menu.   ',\)
C
        QTEST = QATEST + QFTEST + QETEST
        IF (DABS(QTEST) .GT. 3.D-4) GO TO 4380
C
C       New mass flow rates (in channels) after electrochemical reaction.
C       The constants in the expressions below are (Mol.Wt)/nF = MW/n*96500.
C       n=4 for O2, while n=2 for H2 and H2O.
C
        O2FLOWN = O2FLOW(I1,J) - CUR(I,J) * 8.29016D-05      !gm/s-node
        O2FLOWN = DMAX1(0.0D0, O2FLOWN)
        H2FLOWN = GM(I,J1,1) - CUR(I,J) * 1.03627D-05        !gm/s-node
        H2FLOWN = DMAX1(0.0D0, H2FLOWN)
        DELO2 = O2FLOW(I1,J) - O2FLOWN
        DELH2 = GM(I,J1,1) - H2FLOWN
        DELC  = DMIN1( DELO2/8.D0, DELH2 )       !Limiting reactant amount
        GM(I,J,1) = GM(I,J1,1) - DELC
        GM(I,J,2) = GM(I,J1,2) + DELC*9.D0
        DO 4370 K=3,7
4370    GM(I,J,K) = GM(I,J1,K)
        O2FLOW(I,J) = O2FLOW(I1,J) - DELC*8.D0
        A2FLOW(I,J) = A2FLOW(I1,J)
        IF (GM(I,J,1) .LT. 0.0D0) GM(I,J,1) = 0.0D0
        IF (O2FLOW(I,J) .LT. 0.0D0) O2FLOW(I,J) = 0.0D0
C
C       Calculate equilibrium composition after electrochemical consumption
C
        GMLT = 0.0D0
        DO 4375 K=1,7
        GML(K) = GM(I,J,K)/MWT(K)
4375    GMLT = GMLT + GML(K)                     !Total gmols before equilibrium
        DO 4476 K=1,7
4476    GML(K) = GML(K)/GMLT
        CALL EQNEW(GML, TF(I,J), ZF, ZT, ZFR)
C       CALL EQCOMP(7, GML, TF(I,J), ZF, ZT, ZFR)
        DO 4377 K=1,7
4377    GML(K) = GML(K)*GMLT                     !GML(k) = gmols of (k) before equil.
        GMLT = GMLT * ZT                         !GMLT = Total gmols after equilibrium
        DO 4388 K=1,7
4388    GM(I,J,K) = GMLT*ZFR(K)*MWT(K)
        TOTFOUT = GM(I,J,1) + GM(I,J,2) + GM(I,J,3) + GM(I,J,4)
     *          + GM(I,J,5) + GM(I,J,6) + GM(I,J,7) !Total fuel out, gm/sec-node
        TOTAOUT = A2FLOW(I,J) + O2FLOW(I,J)        !Total air out, gm/sec-node
C
C       Heat effect accompanying equilibration
C
        EQHT = 0.0D0
        DO 4374 K=2,5
        CALL DELHF (AVTF, ID(K), DHF(K))
4374    EQHT = EQHT - (GMLT*ZFR(K) - GML(K)) * DHF(K)
        EQHT = EQHT * 4.184D0
C
C       Average mass flowrates through each node
C
        AVO2FLOW = 0.5D0 * (O2FLOW(I1,J) + O2FLOW(I,J))
        AVA2FLOW = 0.5D0 * (A2FLOW(I1,J) + A2FLOW(I,J))
```

```
              DO 4378 K=1,7
4378     AVGM(K) = 0.5D0*(GM(I,J1,K) + GM(I,J,K))
         TAVGM = AVGM(1)+AVGM(2)+AVGM(3)+AVGM(4)+AVGM(5)+AVGM(6)+AVGM(7)
         TEST5 = 0.0D0
         GMAX = DMAX1(AVGM(1),AVGM(2),AVGM(3),AVGM(4),AVGM(5))
         DO 4379 K=1,7
         IF (AVGM(K)/GMAX .GT. 1.D-4)
     *      TEST5 = TEST5 + DABS( (AVGMOLD(K) - AVGM(K))/AVGM(K) )
4379     XM(K) = AVGM(K)/TAVGM                            !Mass frac
C
         FVISC = XM(1)*2.35D-4 + XM(2)*4.2D-4 + XM(3)*4.8D-4   !McAdams, pp.469
     *   + XM(4)*5.1D-4 + XM(5)*3.5D-4 + XM(6)*4.9D-4 + XM(7)*5.5D-4
*
* BEGINNING OF THE PRESSURE DROP CALCULATIONS.
*
         XFLOW = (AVO2FLOW + AVA2FLOW) / ANCN          !gm/s thru each air channel
         YFLOW = (AVGM(1) +AVGM(2) +AVGM(3) +AVGM(4) +AVGM(5)
     *           +AVGM(6) +AVGM(7)) /FNCN             !gm/s thru each fuel channel
         TAVGM = AVGM(1)/MWT(1) + AVGM(2)/MWT(2) + AVGM(3)/MWT(3)
     *         + AVGM(4)/MWT(4) + AVGM(5)/MWT(5) + AVGM(6)/MWT(5)
     *         + AVGM(7)/MWT(7)
         DO 4381 K=1,7
4381     AVXM(K) = (AVGM(K)/MWT(K)) /TAVGM
         AVXO2 = AVO2FLOW/32.D0/(AVO2FLOW/32.D0+AVA2FLOW/28.D0) !Mole frac
         AVGMWAIR = AVXO2*32.D0 + (1.D0-AVXO2)*28.D0     !Avg. Mol. Wt. Air
         AVGMWFUEL = AVXM(1)*MWT(1) + AVXM(2)*MWT(2) + AVXM(3)*MWT(3)
     *             + AVXM(4)*MWT(4) + AVXM(5)*MWT(5) + AVXM(6)*MWT(6)
     *             + AVXM(7)*MWT(7)                     !Avg. Mol. Wt. Fuel
         ADENS = (AVPA /( 82.05D0*AVTA )) * AVGMWAIR    !R=82.05 cm^3-atm/gmol-K
         FDENS = (AVPF /( 82.05D0*AVTF )) * AVGMWFUEL   !Densities in gm/cm^3
         ADELP(I,J) = 9.844D-7*AVISC*SA*XFLOW * CONST1/ADENS
         FDELP(I,J) = 9.844D-7*FVISC*SC*YFLOW * CONST2/FDENS
         PA(I,J) = PA(I1,J) - ADELP(I,J)
         PF(I,J) = PF(I,J1) - FDELP(I,J)
         TOTMFUEL = GM(I,J,1)/MWT(1)+GM(I,J,2)/MWT(2)+GM(I,J,3)/MWT(3)
     *            + GM(I,J,4)/MWT(4)+GM(I,J,5)/MWT(5)+GM(I,J,6)/MWT(6)
     *            + GM(I,J,7)/MWT(7)
         DO 4382 K=1,7
4382     XF(K) = (GM(I,J,K)/MWT(K)) /TOTMFUEL
         XO2 = O2FLOW(I,J)/32.D0/ (O2FLOW(I,J)/32.D0+A2FLOW(I,J)/28.D0) !Mole frac
         PH2(I,J) = PF(I,J) * XF(1)
         PH2O(I,J) = PF(I,J) * XF(2)
         PO2(I,J) = PA(I,J) * XO2
C
         IF (PO2(I,J).LE.0.0D0 .OR. PH2(I,J).LE.0.0D0) THEN
            WRITE (*,4376) PO2(I,J), PH2(I,J), I,J
            WRITE (7,4376) PO2(I,J), PH2(I,J), I,J
C           WRITE (8,4376) PO2(I,J), PH2(I,J), I,J
            IF (PO2(I,J) .LE. 0.0D0) THEN
               APRNT = APRNT * 1.2D0
               GO TO 1000
            ENDIF
            IF (PH2(I,J) .LE. 0.0D0) THEN
               FPRNT = FPRNT * 1.2D0
               GO TO 1000
            ENDIF
         ENDIF
4376     FORMAT (/' WARNING: OXYGEN AND/OR HYDROGEN DEPLETED.',
     *           /' PO2 = ',E11.4,3X,' PH2 = ',E11.4,
     *           5X,'AT (',I2,',',I2,')',
     *           /' INCREASING RELEVANT FLOW BY 20%.',//)
C
         AVPA  = 0.5D0 * ( PA(I1,J)  + PA(I,J)   )
         AVPF  = 0.5D0 * ( PF(I,J1)  + PF(I,J)   )
         AVH2N = 0.5D0 * ( PH2(I,J1) + PH2(I,J)  )
         AVH2ON= 0.5D0 * ( PH2O(I,J1)+ PH2O(I,J) )
         AVO2N = 0.5D0 * ( PO2(I1,J) + PO2(I,J)  )
         IF (AVPH2.GT.0.0D0) THEN
            TEST1 = DABS((AVPH2 - AVH2N)/AVPH2)
         ELSE
            IF (AVH2N.NE.0.0D0) TEST1 = DABS((AVPH2 - AVH2N)/AVH2N)
            IF (AVH2N.LE.0.0D0) TEST1 = 0.0D0
         ENDIF
C
         TEST2 = DABS((AVPH2O - AVH2ON)/AVPH2O)
C
         IF (AVPO2.GT.0.0D0) THEN
            TEST3 = DABS((AVPO2 - AVO2N)/AVPO2)
```

```
            ELSE
               IF (AVO2N.NE.0.0D0) TEST3 = DABS((AVPO2 - AVO2N)/AVO2N)
               IF (AVO2N.LE.0.0D0) TEST3 = 0.0D0
            ENDIF
            PTEST = TEST1 + TEST2 + TEST3 + 0.5*TEST5
            IF (PTEST .LE. 5.D-6) GO TO 4299
                if (iloop .gt. 100) then
                write (42,9876)
      *         i,j,iloop,avph2,avh2n,avpo2,avo2n,avph2o,avh2on,ptest
 9876           format(3i5,7g15.6)
                write (42,9875) (avgmold(k),avgm(k),k=1,4),test5
 9875           format(8g14.5,3x,g15.5)
                endif
C
            IF (ILOOP .GT. 200) THEN
C!          IF (ILOOP .GT. 1000) THEN
               WRITE (*,9877) I,J,AVPH2,AVH2N,AVPO2,AVO2N,AVPH2O,AVH2ON
               WRITE (7,9877) I,J,AVPH2,AVH2N,AVPO2,AVO2N,AVPH2O,AVH2ON
               WRITE (*,1002)
               CALL PROMPT
               STOP 'ILOOP HAS NOT CONVERGED AFTER 200 ITERATIONS (4)'
            ENDIF
            AVPH2  = 0.5*(AVPH2  + AVH2N)
            AVPH2O = 0.5*(AVPH2O + AVH2ON)
            AVPO2  = 0.5*(AVPO2  + AVO2N)
            DO 2407 K=1,7
 2407          AVGMOLD(K) = AVGM(K)
            GO TO 4305
 4299       CONTINUE
C
 9877       FORMAT(/' PARTIAL PRESSURE LOOP NOT CONVERGING AT (I,J): ',
      *             '(',I2','I2,')',
      *            /' AVERAGE PRESSURES OF (H2,H2N,O2,O2N,H2O,H2ON) :',
      *            /6G15.5,
      *            /' - ABORTING RUN -')
C
CCC
            QRES(I,J) = (CUR(I,J)**2)*R
            QENT(I,J) = - (CUR(I,J)/193000.D0) * (DH - DF)
CCC
            IF (I.EQ.2 .AND. J.EQ.2) EQLHEAT=0.0D0
            EQLHEAT = EQLHEAT + EQHT
            IF (TEMPE .LT. TMIN) THEN
               TMIN = TEMPE
               IMIN = I
               JMIN = J
            ENDIF
            IF (TEMPE .GT. TMAX) THEN
               TMAX = TEMPE
               IMAX = I
               JMAX = J
            ENDIF
            IF (EN(I,J) .LT. EMIN) THEN
               EMIN = EN(I,J)
               IMINP = I
               JMINP = J
            ENDIF
            IF (EN(I,J) .GT. EMAX) THEN
               EMAX = EN(I,J)
               IMAXP = I
               JMAXP = J
            ENDIF
 4300    CONTINUE
CLLLLLLLLLLLLLLLLLLLLLLLLLLLLLLLLLLLLLLLLLLLLLLLLLLLLLLLLLLLLLLLL
C!>>>>>
         RESHEAT = 0.0D0
         ENTHEAT = 0.0D0
         HEATGEN = 0.0D0
         DO 20023 I=2,N
         DO 20023 J=2,M
         RESHEAT = RESHEAT + QRES(I,J)
20023    ENTHEAT = ENTHEAT + QENT(I,J)
         RESHEAT = RESHEAT*3.6D3
         ENTHEAT = ENTHEAT*3.6D3
         EQLHEAT = EQLHEAT*3.6D3
         HEATGEN = RESHEAT + ENTHEAT + EQLHEAT
         WRITE (42, 20024) RESHEAT, ENTHEAT, EQLHEAT, HEATGEN
```

```
20024 FORMAT (///2X,' Resistive heat, J/hr              = ',G15.6,
     &          /2X,' Entropy change heat, J/hr        = ',G15.6,
     &          /2X,' Equilibrium heat, J/hr           = ',G15.6,
     &          /2X,' Total heat generated, J/hr       = ',G15.6)
C
C     Energy out as electric power
C
       POWER = 0.0D0
       CD1 = 0.0D0
       DO 20005 I=2,N
       DO 20005 J=2,M
       CD1 = CD1 + CUR(I,J)*EN(I,J)
20005  POWER = POWER + CUR(I,J) * V
       ELECTRIC = POWER * 3600.D0
       WRITE (42, 20016) CD1*3.6D3,RESHEAT,POWER,ELECTRIC
20016  FORMAT (/2X,' Power produced, E*I, J/hr         = ',G15.6,
     &          /2X,' Internal losses, I^2R, J/hr      = ',G15.6,
     &          /2X,' Electric Power delivered, V*I, W = ',G15.6,
     &          /2x,'                         , J/hr   = ',G15.6)
C
C     Chemical energy leaving with product stream.
C
       DO 20000 K=2,5
       CALL DELHF (TFIN, ID(K), DHF(K))
20000  DHF(K) = -DHF(K) * 4.184D0
       CHENOUT = 0.0D0
       DO 20001 I=2,N
20001  CHENOUT = CHENOUT + GM(I,M,1)/2.0D0*DHF(2)              !248736.D0
     &                   + GM(I,M,3)/28.D0*(DHF(4) - DHF(3))   !281846.D0
     &          + GM(I,M,5)/16.D0* (DHF(4)+2.D0*DHF(2)-DHF(5)) !801634.D0
       CHENOUT = CHENOUT * 3600.D0
       WRITE (42, 20011) CHENOUT
20011  FORMAT (/2X,' Chemical energy out, J/hr         = ',G15.6)
C
C     Sensible heat leaving with product stream.
C
       DO 20002 K=1,7
       GMOLSOUT(K) = 0.0D0
       PROUT(K) = 0.0D0
       DO 20002 I=2,N
       PROUT(K) = PROUT(K) + GM(I,M,K)
20002  GMOLSOUT(K) = GMOLSOUT(K) + GM(I,M,K)/MWT(K)
C!     WRITE (42, 20012) (GMOLSOUT(K)*3600.D0,K=1,7)
C!20012 FORMAT (/2X,' Product gases leaving, gmols/hr:  ',/2x,7G15.6)
C
       SENPROD = 0.0D0
       DO 20003 I=2,N
       CALL CPGAS3 (TF(I,M), CPG)
       SENPROD = SENPROD +
     &   ( GM(I,M,1)/2.0D0*CPG(1)   + GM(I,M,2)/18.D0*CPG(2) +
     &     GM(I,M,3)/28.D0*CPG(3)   + GM(I,M,4)/44.D0*CPG(4) +
     &     GM(I,M,5)/16.D0*CPG(5)   + GM(I,M,6)/32.D0*CPG(6) +
     &     GM(I,M,7)/28.D0*CPG(7) ) * 4.184D0* (TF(I,M)-1173.D0) *3.6D3
20003  CONTINUE
       TFAVG = 0.0D0
       DO 6699 I=2,N
6699   TFAVG = TFAVG + TF(I,M)
       TFAVG = TFAVG/(N - 1) - 273.15D0
       WRITE (42, 20014) TFAVG, SENPROD
20014  FORMAT (/2X,' Average product stream temp, C    = ',G15.6,
     &          /2x,' Sensible Heat with prod., J/hr    = ',G15.6)
C
C     Sensible heat leaving with air stream
C
       AZROUT = 0.0D0
       AIRMAS = 0.0D0
       TAVG = 0.0
       DO 20004 J=2,M
       AIRMAS = AIRMAS + O2FLOW(N,J) + A2FLOW(N,J)
       AZROUT = AZROUT + O2FLOW(N,J)/32.D0 + A2FLOW(N,J)/28.D0
20004  TAVG = TAVG + TA(N,J)
       TAVG = TAVG/(M - 1) - 273.15D0
       AIRMAS = AIRMAS * 3600.D0
       AZROUT = AZROUT * 3600.D0
       SENAIR = AIRMAS*CPA*(TAVG - 900.D0)      !J/hr
       WRITE (42, 20015) AZROUT, TAVG, SENAIR
20015  FORMAT (/2X,' Air leaving cell AZROUT, gmols/h = ',G15.6,
```

```
     &          /2X,' Average air exit temperature, C   = ',G15.6,
     &          /2X,' Sensible heat out with air, J/hr  = ',G15.6)
           ZMASOUT = AIRMAS + (PROUT(1) + PROUT(2) + PROUT(3) + PROUT(4)
     &             + PROUT(5) + PROUT(6) + PROUT(7))*3600.D0
           DDD1 = CHENOUT + SENPROD + SENAIR + ELECTRIC
           WASTE = (SENPROD + SENAIR)/3.6D3          !J/hr
           WRITE (42, 20017) AIRMAS, ZMASOUT, DDD1, DDD1/ENERGYIN
20017      FORMAT (/2X,' Air Out, gm/hr                 = ',G15.6,
     &          /2X,' Total Mass Out, gm/hr          = ',G15.6,
     &          /2X,' Total Energy Out, J/hr         = ',G15.6,
     &          /2X,' Energy Out/Energy In           = ',G15.6)
!<<<<<
           WRITE (*,'(A\)') ' Done.'
C          WRITE (*,*)
           IF (IAT .EQ. 1) THEN
           DO 4399 I=2,N
           DO 4399 J=2,M
             K = (I-2)*M + J
             XJ = FLOAT(J-1)/(FLOAT(M-1))
             XI = FLOAT(I-1)/(FLOAT(N-1))
             WRITE(51,4395) XJ, XI, TEL(I,J)-273.15
             WRITE(52,4395) XJ, XI, CUR(I,J)*1000./SCSA
             WRITE(53,4395) XJ, XI, EN(I,J)
             WRITE(54,4395) XJ, XI, PO2(I,J)
             WRITE(55,4395) XJ, XI, PH2(I,J)
4399       CONTINUE
           ENDIF
4395       FORMAT(F15.4,',', F15.4,',', F15.4,',')
C
           CURRENT = 0.0D0
           FUELDP  = 0.0D0
           AIRDP   = 0.0D0
           FGASIN = FPRNT * YTIN / (3600.0D0*22.4D0) !gmols/s of fuel entering
C          FUELIN= FGASIN*(ZFIN(1)+ZFIN(3)+ZFIN(5)) !gmol/s of H2,CO,CH4 entering
           FUELIN = FGASIN*(YFRIN(1)+YFRIN(3)+YFRIN(5)) !gmol/s H2,CO,CH4 entering
           FUELOUT = 0.0D0
           DO 4405 I=2,N
4405       FUELOUT = FUELOUT + GM(I,M,1)/2.0D0 + GM(I,M,3)/28.0D0
     1                       + GM(I,M,5)/16.0D0    !gmols/s of H2,CO,CH4 leaving
           UTIL = (FUELIN - FUELOUT)*100.D0/FUELIN
           O2IN_GPS = (AFLOW*XO2IN) * (273.15*PAIR/TAIR)*(32./22400.)
           O2OUT_GPS = 0.0
           DO 4406 J=2,M
4406       O2OUT_GPS = O2OUT_GPS + O2FLOW(N,J)
           UTILOX = (O2IN_GPS - O2OUT_GPS)/O2IN_GPS * 100.
           DTDX = 0.0D0
           DO 4407 I=2,N
           DO 4407 J=2,M
             IF (I .EQ. 2) TEL(I-1,J) = TAIR
             IF (J .EQ. 2) TEL(I,J-1) = TFIN
             DDI = DABS( TEL(I,J) - TEL(I-1,J) )/SA
             DDJ = DABS( TEL(I,J) - TEL(I,J-1) )/SC
C            DDT = DMAX1 (DDI,DDJ)
C            DTDX = DMAX1(DTDX, DDT)
             DTDX = DMAX1 (DDI, DDJ, DTDX)
4407       CONTINUE
           TVG = 0.0
           DO 4409 J=1,M
           DO 4409 I=1,N
           IF (TEL(I,J) .LE. 0.0) TEL(I,J) = TFUEL
4409       TVG = TVG + TEL(I,J)
           TVG = TVG/(M*N) - 273.15
           DO 4410 J=2,M
           DO 4410 I=2,N
             FUELDP = FUELDP + FDELP(I,J)
             AIRDP  = AIRDP  + ADELP(I,J)
             CURRENT = CURRENT + CUR(I,J)
4410       CONTINUE
           FUELDP = FUELDP / (N-1)
           AIRDP  = AIRDP  / (M-1)
           POWER = CURRENT * V
           EFFIC = POWER*100.D0 / (ENERGYIN/3.6D3)
           EFF2  = ELECTRIC * 1.D2 / (ENERGYIN - CHENOUT)
C
           RETURN
           END SMESSAGE:' End of First Pass '
```

What is claimed is:

1. A solid oxide fuel cell having a plurality of individual cells using a conventional interconnect material with each of said cells comprising:
   an anode consisting essentially of said conventional interconnect material;
   a cathode consisting essentially of said conventional interconnect material with electrolyte disposed between said anode and cathode, said anode and cathode being thin enough to provide short conduction paths and low voltage losses; and
   an interconnect element consisting essentially of said conventional interconnect material coupled to said anode and said cathode with said interconnect element.

2. The solid oxide fuel cell as defined in claim 1 wherein said interconnect element comprises a strontium doped lanthanum chromite.

3. The solid oxide fuel cell as defined in claim 1 wherein said interconnect element can be constructed of at least one of a porous material and a dense material.

4. The solid oxide fuel cell as defined in claim 1 wherein said interconnect element defines an air channel and a fuel channel in each said cell of said fuel cell.

5. The solid oxide fuel cell as defined in claim 1 wherein said interconnect element defines a fuel channel and an air channel.

6. The solid oxide fuel cell as defined in claim 5 further including an electrical interconnect disposed between said fuel channel and said air channel and consists essentially of said one material.

7. The solid oxide fuel cell as defined in claim 6 wherein said air channel has reduced size flow thereby allowing construction of compact fuel cells.

8. The solid oxide fuel cell as defined in claim 6 wherein said electrical interconnect comprises an element having a range from porous to dense material.

9. The solid oxide fuel cell as defined in claim 1 wherein said one material is compatible with sulfur-containing fuels for said fuel cell.

10. A solid oxide fuel cell having a plurality of individual cells with said individual cells comprising:
    an anode and a cathode;
    a gas flow channel described by at least a first interconnect material element; and
    a fuel flow channel described at least in part by a second interconnect element and said first interconnect material element, said second interconnect material element and said anode and said cathode consisting essentially of the same interconnect material with said anode and said cathode being dimensioned to provide good electrical properties.

11. The solid oxide fuel cell as defined in claim 10 wherein said first and said second interconnect material elements is selected from the group consisting of strontium doped rare earth chromites and magnesium doped rare earth manganites.

12. The solid oxide fuel cell as defined in claim 10 wherein said first and second interconnect material elements are manufactured to match thermal expansion coefficients at interfaces between components of said individual cell.

13. The solid oxide fuel cell as defined in claim 10 wherein the porosity of said interconnect material element is modified.

14. The solid oxide fuel cell as defined in claim 10 wherein electrical conduction paths are shortened by minimizing size of said interconnect material elements used therein.

15. The solid oxide fuel cell as defined in claim 10 wherein said channels have reduced size flow thereby allowing construction of compact fuel cells.

16. A solid oxide fuel cell having a plurality of individual cells with each of said cells comprising;
    electrodes having an electrolyte disposed there between; and
    interconnect material elements between said electrodes with said electrodes and said interconnect material elements consisting essentially of the same elemental constituents and said electrodes being dimensioned to provide good electrical properties.

17. The solid oxide fuel cell as defined in claim 16 wherein said electrode and interconnect material elements are selected from the group consisting of strontium doped lanthanum chromites and magnesium doped lanthanum manganites.

18. The solid oxide fuel cell as defined in claim 16 wherein said interconnect material elements include selected levels of porosity.

19. The solid oxide fuel cell as defined in claim 16 wherein said interconnect material elements form at least one layer of less than about 25 microns thickness.

20. The solid oxide fuel cell as defined in claim 16 wherein said electrodes form layers of less than about 25 microns thickness.

* * * * *